United States Patent [19]

Gasoi

[11] Patent Number: 5,141,306
[45] Date of Patent: Aug. 25, 1992

[54] METHOD AND SYSTEM FOR DETERMINING THE EFFECTS OF EXPOSURE ON RECORDING AND REPRODUCTION OF OPTICAL SOUND RECORDS

[75] Inventor: Frederick S. Gasoi, Roxboro, Canada

[73] Assignee: National Film Board of Canada, St-Laurent, Canada

[21] Appl. No.: 737,018

[22] Filed: Jul. 29, 1991

[51] Int. Cl.$^5$ .................. G03B 31/00; G03B 31/02
[52] U.S. Cl. ............................ 352/244; 352/5; 352/27
[58] Field of Search ............................ 352/5, 27, 244

[56] References Cited

U.S. PATENT DOCUMENTS

| | | | |
|---|---|---|---|
| 3,932,032 | 1/1976 | Weinstein | 352/27 |
| 4,461,552 | 7/1984 | Levine | 352/27 |
| 4,600,280 | 7/1986 | Clark | |

*Primary Examiner*—Monroe H. Hayes
*Attorney, Agent, or Firm*—Ronald S. Kosie; Robert Brouillette

[57] ABSTRACT

A method is provided for assessing the effect of exposure conditions on the recording and reproduction of an optical sound track, comprising, a) providing the optical sound track with an image test pattern which is an image of a desired test pattern, the image test pattern being configured such that the image test pattern will induce a photosensor device to generate a test signal which repetitively alternates between two different states, the image test pattern being applied to the track under predetermined exposure conditions, b) optically scanning the optical sound track with the photosensor device to generate, in response thereto, the test signal which repetitively alternates between two different states, c) comparing the duration of one of the states with duration of the other state so as to obtain a time difference value, and d) comparing the so obtained time difference value with a predetermined time difference value associated with the desired test pattern, any departure from the predetermined time difference value being indicative of dimensional differences between the image test pattern as obtained under the predetermined exposure conditions and the desired test pattern. A system for carrying out this method is also provided.

11 Claims, 3 Drawing Sheets

METHOD AND SYSTEM FOR DETERMINING THE EFFECTS OF EXPOSURE ON RECORDING AND REPRODUCTION OF OPTICAL SOUND RECORDS

BACKGROUND OF THE INVENTION

This invention relates to a system and a method which together are capable of analyzing or assessing to a very high degree of resolution the effects of over- and under-exposure of photographic film negative and print optical sound tracks (e.g. such as for motion picture film) so as to miniminize or eliminate the effects of exposure on image size. Although the system is designed to be used in conjunction with the emerging technology of digital optical sound tracks, it is equally applicable to traditional industry standard analogue optical sound tracks.

Motion pictures have historically employed a variety of types of sound tracks, involving both optical and magnetic recording media. Standard industry practice for the 35 mm theatrical release format has for many years been the so-called variable area optical sound track. In accordance with this standard practice, a 1/10" wide track, alongside the picture area, is dedicated to the optical sound track. In general, sound is recorded on the film by exposing the area dedicated for the sound track to a source of light (visible or otherwise) so that the sound track comprises a portion which is essentially opaque and a portion which is left essentially transparent, the ratio between the two portions being proportional to the instantaneous amplitude of the sound signal being recorded. In reproduction, a light source is focused through a slit onto this track, on the far side of which is a photo-sensitive solar cell. The electrical output of the cell is an instantaneous measure of the amount of light passing through the film, and is thus a function of the amplitude of the sound being reproduced.

As is true with the picture element of a motion picture film, the sound element is first recorded on a negative, and is then printed onto a positive, which is subsequently distributed to theatres. In order to achieve an adequate measure of opacity in the print so as to achieve acceptable electrical signal levels in the sound reproducer, the print must be over-exposed. In order to maintain an adequate level of transparency under these over-exposure conditions, the negative must also be over-exposed. A consequence of this is image spread, i.e. the tendency for an image to grow in size in relation to the length of time of exposure. The exposed areas tend to grow, to the detriment of the unexposed areas. This characteristic, if uncompensated, would result in distortion of the sound. Fortunately, since exposed areas on the positive correspond to unexposed areas on the negative, the two effects can be made to cancel. Corrections can also be made for light scatter, film grain, and any other effects which tend to result in inaccuracies in the image.

An ingenious method for determining the optimum exposure conditions for both negative and print so as to result in cancellation of all deleterious effects on image size was described by Baker and Robinson, and has become industry-standard practice (J. V. Baker and D. H. Robinson, "Modulated High-Frequency Recording as a Means of Determining Conditions for Optimal Processing," Journal of the Society of Motion Picture Engineers, Vol. 30, p. 3, Jan. 1938). This method has come to be known as the "cross-modulation test". It is used routinely as a quality assurance mechanism prior to actual sound recording to verify the capability of the process to eliminate the effects of component (particularly exposure lamp) aging, changes in film characteristics from production batch to production batch, and so forth.

The above mentioned "cross-modulation test" is based on the fact that a perfect sinusoid comprising a high frequency signal modulated by a low-frequency one, will have an average value of zero. In the case of a perfect optical image of such a sinusoid, the average light transmission will be constant. In the case of underexposure or overexposure, some of the low-frequency modulation component will be introduced into the average value of the signal and may be detected. In practice a high frequency carrier at about 10 Kilohertz is modulated at about 75% by a 400 Hertz signal. The resulting image is played back through a low-pass filter to eliminate the high frequency carrier, and the amount of 400 Hertz signal remaining is analyzed to determine the exposure and printing conditions which result in the lowest-level signal.

In recent years, a number of proposals have been put forth to replace the traditional optical analogue sound track with an optical digital sound track. Potential methods for recording and reading a digital soundtrack on motion picture film are, for example, described in U.S. Pat. No. 4,600,280; such methods have the basic capability of recording and reading information as a series of linear arrays composed of opaque and transparent spots, representing binary ones and zeroes.

An optical digital soundtrack would replace the continuously-varying waveform presently recorded as an analogue of sound pressure level, with a pattern of minuscule opaque and transparent spots representing a binary number whose value is a measure of the instantaneous sound pressure level. The use of digital recording techniques is expected to duplicate the considerable improvements in quality and longevity that have been achieved in the migration from (analogue) vinyl long-play records to (digital) Compact Discs in the home entertainment industry.

The recording and reproduction process for digital sound tracks, however, will require even greater accuracy in image reproduction than is required for analogue sound tracks.

SUMMARY OF THE INVENTION

Accordingly, the present invention, in one general aspect, provides a method for assessing the effect of exposure conditions on the recording and reproduction of an optical sound track, comprising, a) providing the optical sound track with an image test pattern which is an image of a desired test pattern,
  the image test pattern being configured such that the image test pattern will induce a photosensor means to generate a test signal which repetitively alternates between two different states, the image test pattern being applied to the track under predetermined exposure conditions, b) optically scanning the optical sound track with the photosensor means to generate, in response thereto, the test signal which repetitively alternates between two different states, c) comparing the duration of one of the states with the duration of the other state so as to obtain a time difference value, and d) comparing the so obtained time difference value with a predetermined time difference value associated with the desired test pattern, any departure from the predetermined time difference value being indicative of dimensional differences between the image test pattern as obtained under the predetermined exposure conditions and the desired test pattern.

The expression "time difference value" as used herein shall be understood as referring to the value obtained after subtracting the duration value of one or more of the test signal states from the duration value of one or more of the other (different) states thereof; preferably, the time difference value is the value obtained after submitting a pair of different states to such subtraction process. Thus as used herein, the expression "comparing the duration of one of the states with the duration of the (respective) other state" (or any analogous expression), as well as the verb "compare", shall be understood as referring to a subtraction process wherein one (duration) value is subtracted from another. Such comparisons may be accomplished in any suitable or desired manner (e.g. electronically, mechanically, manually, visually or the like or by any combination thereof).

As can also be appreciated if the image test pattern represents a faithful reproduction of the desired test pattern then on comparing the respective time difference values thereof, they will be the same; the time difference values will, however, differ (i.e. depart from each other) to the extent that the image test pattern deviates from the desired test pattern.

In accordance with a particular aspect of the present invention a method is provided for assessing the effect of exposure conditions on the recording and reproduction of an optical sound track on motion picture film, comprising, a) providing the optical sound track with an image test pattern which is an image of a desired test pattern,
the image test pattern being configured such that the image test pattern will induce a photosensor means to generate a test signal which repetitively alternates between two different states, the image test pattern being applied to the track under predetermined exposure conditions, b) optically scanning the optical sound track with the photosensor means to generate, in response thereto, the test signal which repetitively alternates between two different states, c) for each pair of different states of the test signal, comparing the duration of one of the states thereof with the duration of the respective other state thereof so as to obtain a time difference value, and d) comparing the so obtained time difference value with a predetermined time difference value associated with the desired test pattern, any departure from the predetermined time difference value being indicative of dimensional differences between the image test pattern as obtained under the predetermined exposure conditions and the desired test pattern.

In accordance with the present invention, any pattern of clear (e.g. transparent) and dark (e.g. opaque) areas may possibly be used as a desired test pattern. Any (model or ideal) pattern that it is desired to use must, however, be configured such that, when imaged onto the sound track, the image test pattern obtained under the predetermined exposure conditions will be configured such that the image test pattern can induce the requisite signal on being scanned by suitable optical scanning means. Preferably, a test pattern is chosen which is a simple one; such as the test pattern that shall be described herein by way of example.

Any suitable means, as may be known in the art, may be used to record the image test pattern on film. Similarly, any suitable means, as may be known in the art, may be used to scan the image test pattern on the film to generate the test signal.

In accordance with the present invention, the image test pattern may, for example, comprise alternating regions of essentially transparent and essentially opaque parallel bars disposed normal to the direction of motion picture film travel, the desired test pattern comprising bars as defined above which are of height equal to the characteristic dimension of the digital sound data it is desired to record on the film.

Additionally, in accordance with the present invention, the image test pattern may, if desired, comprise alternating regions of essentially transparent and essentially opaque parallel bars disposed normal to the direction of motion picture film travel, the desired test pattern comprising bars as defined above which are of height equivalent to half the period of the highest frequency analogue sound signal desired to be recorded.

The present invention in accordance with a further general aspect, provides an analyzer system for analyzing a test signal, which repetitively alternates between two different states, by comparing the duration of said states, the analyzer system comprising (a) a clock means for generating a clock signal, the clock signal being composed of a clock pulse which repeats at a predetermined frequency, (b) a count command means for generating a count signal, the count command means having an input for the test signal, the count command means having two different states and being electrically connected to the clock means, the count command means being configured to alternate between the two different states thereof in synchronization with the clock signal and in response to the change of state of the test signal,
the count signal comprising a plurality of pairs of duty cycle signal portions, each pair of duty cycle signal portions comprising one duty cycle signal portion which is generated during the time interval that the count command means is in one of its states and a different duty cycle signal portion which is generated during the time interval that the count command means is in the other of its states, (c) an electronic up-down counter means for counting the number of the clock pulses in the clock signal,
the up-down counter means being electrically connected to the clock means,
the up-down counter means being electrically connected to the count command means such that, in response to each pair of duty cycle signal portions, the up-down counter means,
counts up for the duration of one duty cycle signal portion thereof and
counts down for the duration of the other duty cycle signal portion thereof, the up-down counter means generating a digital signal varying with the level of the count, the up-down counter means having a reset input, (d) latch means for taking up a digital signal generated by the up-down counter means,
the latch means having an activation input, and (e) a counter reset means for generating a reset signal for resetting the up-down counter means and an activation signal for activation of the latch means,
the counter reset means being electrically connected to the count command means, the reset input of the up-down counter means and the activation input of the latch means,
the counter reset means being configured such that the activation and reset signals are generated in response to the count signal, at the end of a plurality of duty cycle signal portions thereof, and
the counter reset means being configured such that, prior to the up-down counter means being reset in response to the reset signal, the latch means takes up, in response to the activation signal, the digital signal as generated by the up-down counter means at the end of the plurality of duty cycle signal portions,
the latch means generating a digital number output signal varying with the digital signal taken up by the latch means.

In accordance with the present invention the counter reset means may, as desired, function in response to two or more duty cycle signal portions. However, in accordance with a particular embodiment of the present invention, the counter reset means may function in response to a pair of duty cycle signal portions. Thus, the present invention provides a particular embodiment of a system as defined above wherein the counter reset means is configured such that the activation and reset signals are generated in response to the count signal, at the end of a pair of duty cycle signal portions thereof, and the counter reset means is configured such that, prior to the up-down counter means being reset in response to the reset signal, the latch means takes up, in response to the activation signal, the digital signal as generated by the up-down counter means at the end of each pair of duty cycle signal portions.

In accordance with a particular aspect, the present invention provides a system for assessing the effect of exposure conditions on the recording and reproduction of an optical sound track on motion picture film, the track being provided with a test pattern, the system comprising, i) photosensor means for optically scanning the optical sound track and for generating, in response thereto, a test signal which repetitively alternates between two different states, ii) an analyzer system for analyzing the test signal by comparing the duration of the (different) states, the test pattern having been configured to induce the photosensor to generate the test signal, the photosensor means being electrically connected to the analyzer system for feeding the test signal thereto, the analyzer system comprising (a) a clock means for generating a clock signal, the clock signal being composed of a clock pulse which repeats at a predetermined frequency, (b) a count command means for generating a count signal,
the count command means having an input for the test signal, the count command means having two different states and being electrically connected to the clock means,
the count command means being configured to alternate between the two different states thereof in synchronization with the clock signal and in response to the change of state of the test signal,
the count signal comprising a plurality of duty cycle pulses, each duty cycle pulse comprising a pair of duty cycle signal portions, each pair of duty cycle signal portions comprising one duty cycle signal portion which is generated during the time interval that the count command means is in one of its states and a different duty cycle signal portion which is generated during the time interval that the count command means is in the other of its states, (c) an electronic up-down counter means for counting the number of the clock pulses in the clock signal,
the up-down counter means being electrically connected to the clock means,
the up-down counter means being electrically connected to the count command means such that, in response to each duty cycle pulse, the up-down counter means,
counts up for the duration of one duty cycle signal portion thereof and
counts down for the duration of the other duty cycle signal portion thereof,
the up-down counter means generating a digital signal varying with the level of the count,
the up-down counter means having a reset input, (d) latch means for taking up a digital signal generated by the up-down counter means,
the latch means having an activation input, and (e) a counter reset means for generating a reset signal for resetting the up-down counter means and an activation signal for activation of the latch means,
the counter reset means being electrically connected to the count command means, the reset input of the up-down counter means and the activation input of the latch means,
the counter reset means being configured such that the activation and reset signals are generated in response to the count signal, at the end of each duty cycle pulse thereof, and the counter reset circuit means being configured such that, prior to the up-down counter means being reset in response to the reset signal, the latch means takes up, in response to the activation signal, the digital signal as generated by the up-down counter means at the end of each duty cycle pulse,
the latch means generating a digital number output signal varying with the digital signal taken up by the latch means.

In accordance with the present invention a system as defined above may also, as desired, include a digital-to-analogue converter means for converting the digital number output signal of the latch means to an analogue signal proportional to the value of the digital number output signal as applied to the input of the digital-to-analogue converter means,
the digital-to-analogue converter means being electrically connected to said latch means, and
signal display means for viewing the analogue signal,
the signal display means being electrically connected to the digital-to-analogue converter means.

The signal display means may, for example, be selected from the group which includes devices such as a chart recorder, an oscilloscope and the like.

As indicated above, the present invention may be used in relation to (methods for) recording a digital soundtrack on motion picture film; in accordance with such methods information (i.e. sound) may be recorded as a series of linear arrays of spots representing binary ones and zeroes, the arrays of spots being formed from opaque and transparent spots. Examples of such recording methods, which may possibly be used in the context of the present invention, are described in Clark (U.S. Pat. No. 4,600,280). The present invention will be more particularly described hereinafter with the intent of using it in relation to such digital sound tracks, however, it is to be understood that this is being done by way of example only.

The present invention may, as mentioned above, exploit test patterns which are composed of transparent and opaque areas. The desired test pattern may take any form for which a time difference value may be predetermined. Preferably, the image test pattern is an image of an ideal or model test pattern as described herein. Recourse to an ideal or model test pattern rather than to real program material is mandated by the ease of analysis of such a pattern; a model test pattern can produce results which are applicable to real situations.

A complex test pattern may possibly be used for the model test pattern, provided that the transparent and opaque areas share at least one common dimensional parameter (e.g. height) which can be examined and compared for analysis purposes. Since image growth is an isotropic phenomenon (i.e. overexposed images grow uniformly in all directions), it suffices to examine image growth in any one direction in order to compensate all directions. The common dimensional parameter (e.g. height) for the opaque and transparent areas can have a value which is the same or different. The predetermined time difference value for the model test pattern will vary in accordance with the value attributable to these dimensional parameters.

For example, in the case of a pair of opaque and transparent areas, if the common dimensional parameter (e.g. height) for each area, has the same value, the predetermined time difference value will be zero. On the other hand, to the extent that the value of the common dimensional parameter is different for each of these areas, the predetermined time difference value may be some constant non-zero value; for example, if the opaque areas have a dimensional parameter (e.g. height) which is one-half the value of the same dimensional parameter for the transparent areas, the predetermined time difference value may be some non-zero value which will reflect the ideal duration of the portion of the test signal devoted to the opaque areas or (in other words) one half of the ideal duration of the test signal attributable to the transparent areas. Preferably, the opaque and transparent areas of the chosen pattern are dimensionally the same; that is they have the same form and size and any common dimensional parameter thereof has the same value so that the predetermined time difference value is zero.

The present invention will be more particularly described hereinafter by reference to a preferred model test pattern which shall be referred to herein, as the bar test pattern. It is to be understood, however, that this is being done by way of example only.

The bar test pattern comprises a pattern of alternating opaque and transparent bars (or rows), the bars (or rows) all being of equal height and width. The bars are disposed normal to the direction of motion picture film travel, at a bar height equal to the characteristic dimension of the system being employed, and with a bar width of the entire (standard) optical soundtrack area. For example, if the characteristic spot size of the recording system were 15 microns, resulting in a bar (row) width of 169 spots, the recording system would be requested to record in the sound track area, a bar (row) of 169 "ones" followed by a bar (row) of 169 "zeroes" so as to form a pair of opaque and transparent bars; the system would repeat the process to form a plurality of such pairs.

As can be gleaned from the above, the aim herein is to measure or assess the departure of the final images (produced under various exposure scenarios) from the ideal image. The above mentioned bar test pattern advantageously lends itself for use herein because of its simple structure; the ideal image for the bar test pattern being a simple pattern of alternating opaque and transparent bars of equal height, the predetermined time difference value (as shall be further described hereinafter) for a pair of opaque and transparent bars, is zero.

BRIEF DESCRIPTION OF THE DRAWINGS

In drawings which illustrate an example embodiment(s) of the present invention.

DESCRIPTION OF EXAMPLE EMBODIMENT(S)

Figure 1A:
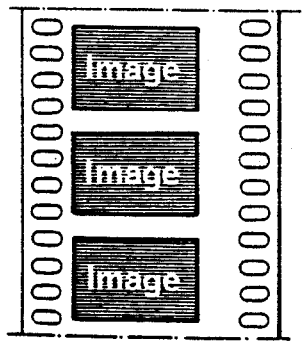
FIGS. 1A, 1B, 1C, 2A, 2B, 2C, 3A, 3B and 3C show examples of negatives and corresponding prints of test motion picture film strips which illustrate, by reference to the bar test pattern mentioned above, some of the problems in recording and reproducing an optical sound track.

As indicated above, examples of test film strips which illustrate some of the problems in recording and reproducing an optical sound track are shown in FIGS. 1A, 1B, 1C, 2A, 2B, 2C, 3A, 3B and 3C. In practice, the picture image may not be on the same negative as the sound track, since the latter is black-and-white film. In this case, a pair of separate negatives (one negative for the picture image and one negative for the sound track) are printed sequentially onto the positive at the time of printing; FIGS. 1A and 1B, FIGS. 2A and 2B and FIGS. 3A and 3B each constitute a pair of such negatives.

Referring to FIGS. 1B, 1C, 2B, 2C, 3B and 3C, reference numerals 1, 1', 2, 2' 3 and 3' indicate the general disposition of the optical sound track on respective film strips. As can be seen the optical sound tracks are provided with an image test pattern consisting of alternating clear and dark bars disposed normal to the longitudinal axis of the film (i.e. normal to the direction of travel of the film indicated generally by arrows 4, 5 and 6). Each bar occupies essentially the entire width of the sound track.

Figure 1B:
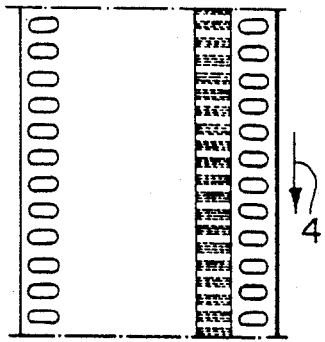

FIG. 1B shows a negative which has been recorded at an exposure level such that there is no image growth. As a consequence, the longitudinal dimensions (i.e. height) of the opaque and transparent bars are identical. Also as a consequence, the opaque sections are far from opaque, being more or less gray, as it is not possible to achieve zero image growth while also achieving high photographic density (opacity). When such a negative is printed (see FIG. 1C) at an exposure level such that there is no image growth in the printing, the resulting contrast ratio between the nominally opaque areas and the nominally transparent areas is inadequate, as both are now different shades of gray.

Figure 2A:
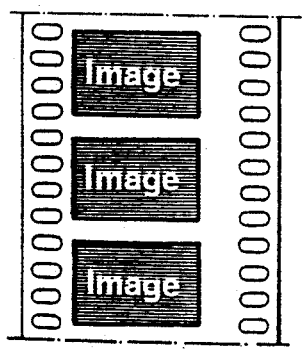
Figure 2B:
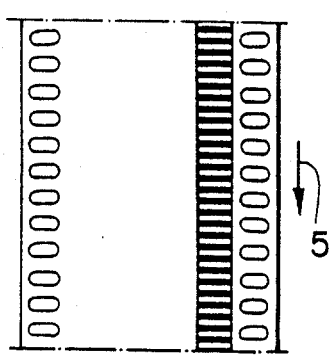

FIG. 2B, shows a negative which represents an artificial case created on the assumption that it would be possible to create a negative with high photographic density, which retains the desired equal ratio between opaque and transparent areas. When such a hypothetical negative is printed (see FIG. 2C) at the high exposure level required to achieve high density in the print, image growth causes the opaque areas to grow and the transparent areas to shrink, as shown, causing a departure from the desired equal ratio.

Figure 3A:
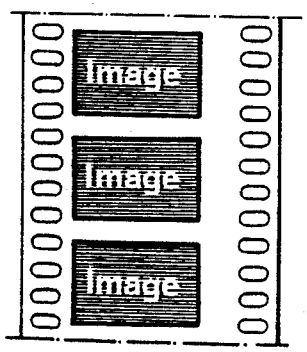
Figure 3B:
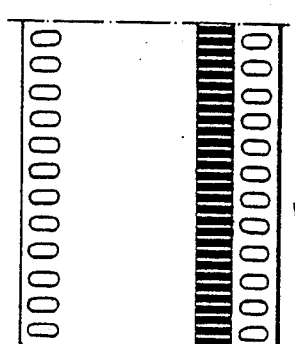

FIG. 3B shows a negative which has been overexposed to a suitable density, resulting in unavoidable image growth in the exposure process. When overexposed in printing (see FIG. 3C), the image growth in the printing process, which is the same as in the initial exposure, but applied to the inverse areas (as opaque now becomes transparent and vice-versa) causes the desired result.

Figure 2C:
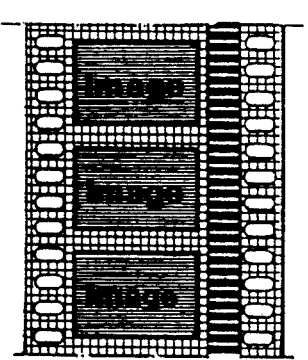
Figure 3C:
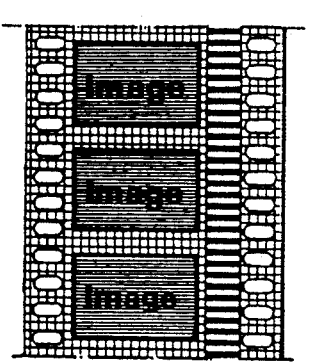
Figure 4:
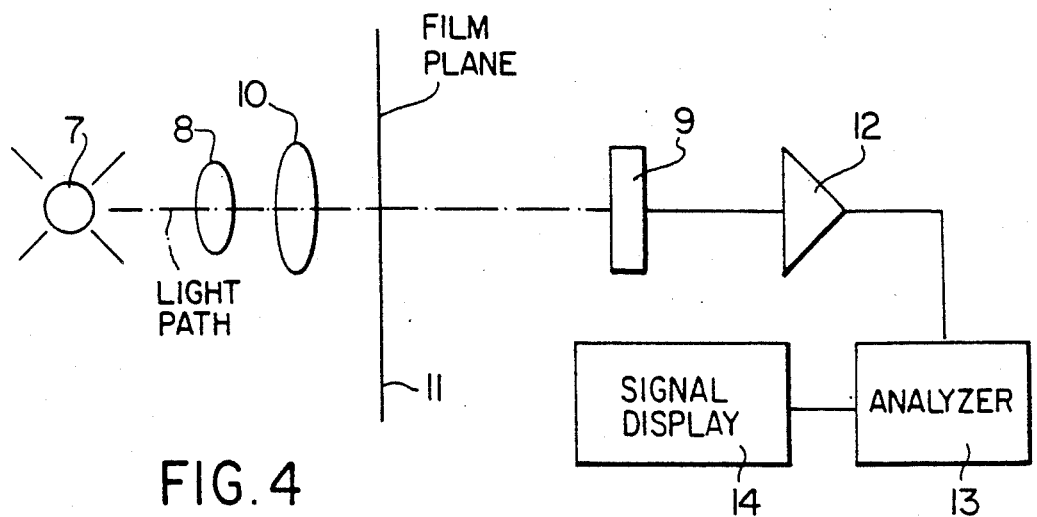
FIG. 4 shows a block diagram of an example embodiment of a system in accordance with the present invention.

Turning to FIG. 4, this figure shows the general physical layout of the elements of an example embodiment of an overall system for performing an analysis, as herein described, on a motion picture film strip provided with an image test pattern such as illustrated in the various FIGS. 1A through 3C and which is based on the bar test pattern referred to above.

The photosensor means generally comprises a light source 7, (either incandescent, fluorescent, or solid-state), a condensing lens 8, a standard film transport apparatus (not shown), a photoreceptor 9 of suitable type, (such as for example a silicon photodiode or phototransistor), an objective lens 10 which includes an aperture block in the form of a lateral slit (not shown) so that not more than one bar (row) is imaged at a time onto the photoreceptor 9. The greater the degree of magnification, the higher the resolution of such photosensor means. Such photosensor means are known. The photosensor means operates as follows:

The light source 7 is imaged by the condensing lens 8 onto the slit (not shown), the image of which is focused by the objective lens 10 onto the plane of the moving film print (or negative) the film is carried through the system at standard speed (18 inches/sec for 35 mm film, 7.2 inches/sec for 16 mm film) by the standard transport apparatus. The sound track is then imaged onto the photoreceptor 9. The output of the photoreceptor 9 may be amplified, as required, by an amplifier device 12, in order to achieve standard logic levels of less than 0.4 volts for a zero and greater than 2.0 volts for a one. The absolute polarity of the output logic signal (i.e. test signal) is irrelevant (i.e. it is not important whether the presence of light yields a one and darkness yields a zero or vice-versa). The test signal so obtained is applied to an analyzer circuit shown generally at 13; an example embodiment of an analyzer system in accordance with the present invention shall be described hereinafter with reference to FIG. 5.

A perfect test pattern image on the film, in which the opaque and transparent bars are exactly equal in height, will cause the photosensor means to produce a test signal in which the duration of the logic one is identical to the duration of the logic zero. Such a test signal is a square wave, or a signal with a so-called 50% duty cycle, meaning that it spends 50% of its time in each logic state. Any deviation from such perfect image of the test pattern on the film will result in a test signal which departs from the ideal 50% duty cycle, spending more of its time in one logic state than in the other. It is the function of the analyzer to determine or assess the degree, if any, to which this takes place. A perfect test pattern image on the film will result in an output value, (namely, a time difference value), from the analyzer, of zero; any departure from the ideal will result in non-zero output values, (namely, non-zero time difference values), from the analyzer, with higher values indicating greater image spread conditions.

The analyzer may be adapted to provide a suitable output (e.g. an analogue output) which may, as shown, be applied to any suitable signal display means 14, such as a chart recorder, where it will produce a continuous tracing for subsequent analysis; for immediate analysis, this signal may be applied to an oscilloscope for viewing in real time. Alternatively the analyzer may be adapted to provide a suitable output (e.g. a digital signal) which may be fed to some suitable electronic device for storage therein, to some suitable storage medium such as a computer disk or tape, to some digital display means such as a printer or to some digital analysis means such as a computer.

Figure 5:
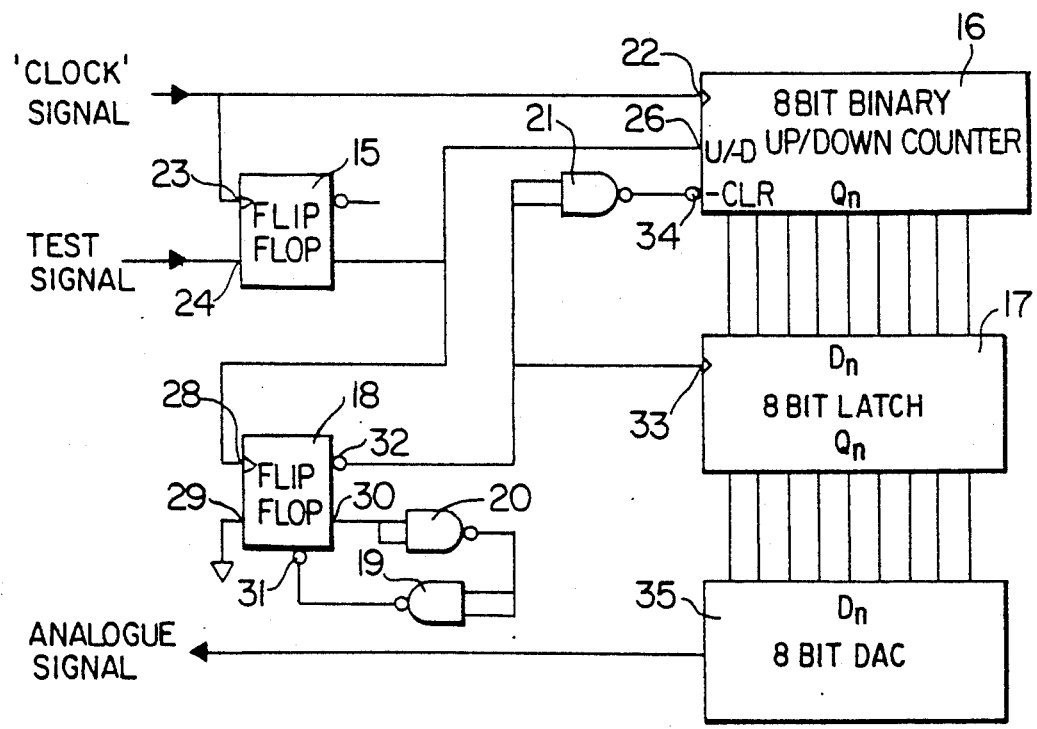
FIG. 5 shows a block diagram of an example embodiment of an analyzer system in accordance with the present invention.

Turning to FIG. 5, this figure illustrates an example of an embodiment of an analyzer system of the present invention; the illustrated analyzer system may be made up from known standard logic elements.

The analyzer system as shown in FIG. 5 is driven from a local clock source (not shown) which generates a high-speed square wave referred to as the OSC (oscillator) signal or clock signal. The clock signal frequency required is a function of film speed and row height, and may be predetermined for a particular system by reference to the following formula:

$$f_{osc} = 128 \times \frac{V_{film}}{R \times H_{row}} \qquad \text{EQN (1)}$$

where
$f_{osc}$ = the frequency of the oscillator, in Hertz
$V_{film}$ = the velocity of the film, in length units per second
$H_{row}$ = the height of a row of spots' in length units.
R = the worst-case expected image spread ratio, expressed as a positive decimal number less than one.
The derivation of EQN (1) will be described in more detail below.

Referring back to FIG. 5 the analyzer system shown has a count command means which comprises flip-flop element 15, an electronic up-down counter means which comprises 8-bit binary up-down counter element 16, a latch means comprising 8-bit latch element 17 and a counter reset means comprising flip-flop element 18 and three propagation delay elements 19, 20 and 21, each delay element comprising a logic gate which performs a logical inversion function as well as a delay function. The latch means is adapted to provide an output signal which follows the input from the up-down counter means thereto whenever the latch activation signal is present but which provides an output which remains constant whenever the latch activation signal is absent.

Figure 6:
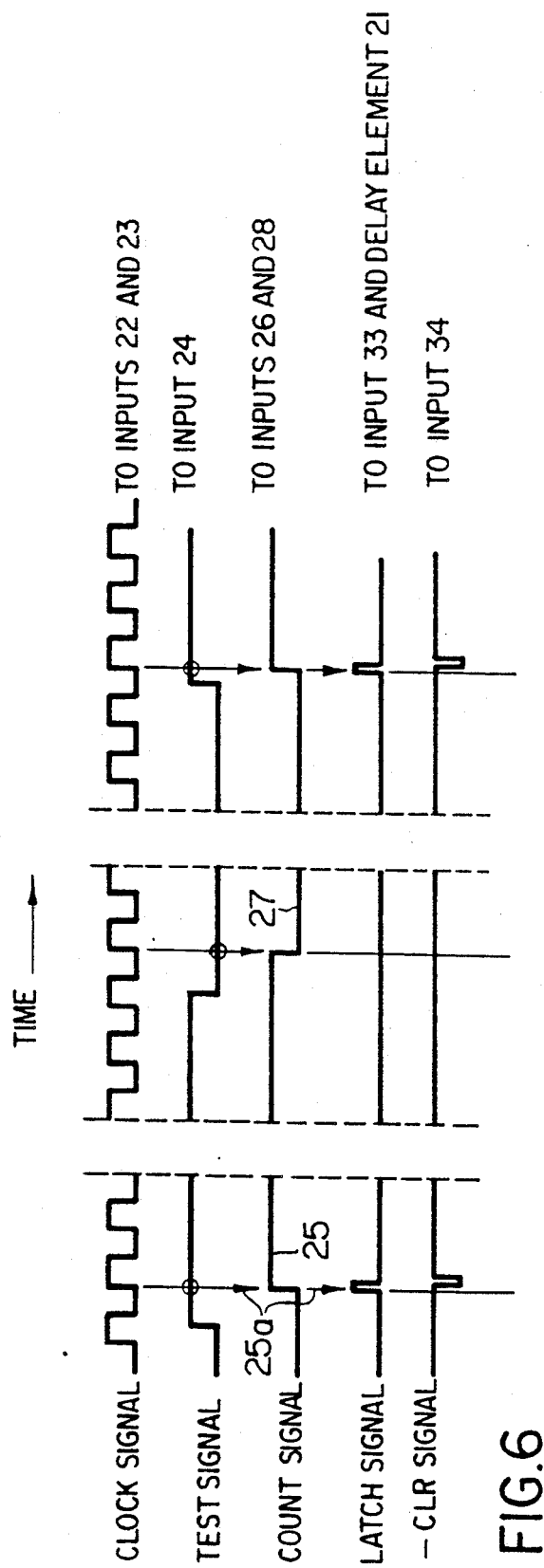
FIG. 6, shows the progression of various signals through the analyzer system of FIG. 5 over a sample time period.

Referring to FIGS. 5 and 6, the incoming clock signal is applied to the clock input 22 of 8-bit binary up-down counter element 16; the clock signal is also fed to the flip-flop clock input 23 of flip-flop element 15. The incoming test signal is applied to the flip-flop data input 24 of flip-flop element 15.

The flip-flop element 15, in response to the test signal, changes state in synchronization with the rising edge of the clock signal. The duty cycle signal portion 25 (see FIG. 6) thus generated by the (change in state of) flip-flop element 15 is thence applied to the up-down control input 26 of 8-bit binary up-down counter element 16. This is shown in time sequence by reference to the first set of arrows (indicated generally by the reference number 25a) in the timing diagram FIG. 6.

It will be noted from FIG. 6 that just prior to the change in state of flip-flop element 15, the test signal has changed state from a "zero" to a "one". The first set of arrows 25a coincide with the next following rising edge of the clock signal following in time, which results in the count (positive true COUNT UP/negative true COUNT DOWN) signal changing state. Thus, it is at the point shown by the first set of arrows 25a that up-down counter element 16 is switched, in response to the duty cycle signal portion 25, into its COUNT UP mode, assuming for the moment that its −CLR (negative-true CLEAR) input is in the logical one state. The up-down counter element 16 thenceforth begins to count, in a monotonically increasing manner, the positive-going transitions of the clock signal.

At some point, the test signal will go to the logical zero state, in response to a transition in the transparency of the film. This transition in logic level is again synchronized to the clock signal by flip-flop element 15, as described above, and causes up-down counter element 16, in response to duty cycle signal portion 27 to switch into its COUNT DOWN mode. The value attained during the COUNT UP period now begins to monotonically decrement. (Duty cycle signal portions 25 and 27 together constitute a duty cycle pulse.)

If the ideal test pattern image exposure conditions obtain, represented by the generation of equal periods of logical one and logical zero in the test signal, and assuming that counter element 16 commenced operation with an initial value of zero, the counter decrementing period will be equal to the counter incrementing period and the remnant value in the register of the up-down counter element 16 will be zero. Any departure from the ideal will leave some non-zero remnant value in up-down counter element 16 at the time of the next transition of the test signal to the logical one state. This transition, synchronized as already described, causes two other functions to occur in addition to switching the count mode of up-down counter element 16. These two functions are mediated by flip-flop element 18, as described hereinafter.

At the end of the previous duty cycle pulse, the rising edge of the count signal (see arrows 25a) is applied to the CLOCK input 28 of flip-flop element 18, and causes the flip-flop element 18 to assume its RESET state by virtue of the fact that its DATA INPUT 29 is connected to a logical zero. After a time, referred to as a propagation delay, the value at the DATA INPUT terminal 29 is transferred to the DATA OUTPUT terminal 30. This terminal is connected to a series of delay elements 19 and 20, i.e. two logic gates which are configured so as to perform a delay function. Two such logic elements are used in this embodiment since as mentioned above each of these elements performs a logical inversion function as well as a delay function, and a non-inverting delay is required for this embodiment by the demands of the PRESET input terminal 31 of flip-flop element 18. Any other even number of inverting delay elements may be used to achieve the same result; or as needed, any odd number where the demands of the input terminal 31 are reversed. The negative-going signal, now delayed by three propagation delays (that of the flip-flop element 18 plus those of the two delay elements 19 and 20) is thence applied to the PRESET input terminal 31 of flip-flop element 18, causing the flip-flop element 18 to change logic states and, after one more propagation delay, forcing the DATA OUTPUT terminal 30 into the logical one state. The output at the DATA OUTPUT terminal 30 is thus a very brief negative-going pulse, equal in width to four propagation delays. Depending on the logic families used, this pulse may vary in width from 20 to 100 nanoseconds.

The negative-going pulse at the DATA OUTPUT terminal 30 of flip-flop element 18 is mirrored by a positive-going pulse at its −DATA OUTPUT terminal 32. The rising, or leading edge of this pulse from the flip-flop element 18, shown as the LATCH (activating) signal in FIG. 6, is applied to the LATCH activation input 33 of 8-bit latch element 17, causing the latch element 17 to take up or store the digital (e.g. binary) value presented to its data inputs by the up-down counter element 16. This value is the remnant value contained in the up-down counter element 16.

The pulse from the -DATA OUTPUT terminal 32, however, is not only applied to the latch element 17 but also to the delay element 21. A single logic element is used in this embodiment since as mentioned above this element performs a logical inversion function as well a delay function, and an inverting delay is required for this embodiment by the demands of the −CLR input terminal 34 of up-down counter element 16. Any other odd number of inverting delay elements may be used to achieve the same result; or as needed, any even number where the demands of the input terminal 34 are reversed. The output pulse issuing from the delay element 21 is the counter reset signal which is applied to the −CLR input 34 of up-down counter element 16, zeroing the up-down counter element 16. In this way the reset signal fed to the up-down counter element 16 is delayed one propagation delay with reference to the activation signal applied to the latch element (i.e. by the presence of a logic gate in the signal path), allowing the remnant count to be present long enough for its value to be taken up by the latch element 17 before it disappears. The reset signal is shown as the −CLR signal in FIG. 6. The process then starts all over.

Thus, for every complete duty cycle pulse of the test signal, a remnant count, proportional to the departure of this signal from an ideal square wave, is taken up by the latch element 17, the up-down counter element 16 is zeroed and reset into its count up mode, and the circuitry prepared for another duty cycle pulse.

In the embodiment illustrated in FIG. 5, the outputs of the latch element 17 are applied to a digital-to-analogue converter means comprising an 8-bit digital-to-analogue converter element 35, whose output (i.e. the time difference value) is an analogue (e.g. voltage) signal proportional to the value of the digital (e.g. binary) number applied to its inputs. For immediate analysis, the so obtained analogue signal may be applied to an oscilloscope or similar device for viewing in real time. Alternatively, for subsequent analysis, the obtained analogue signal may be applied to a chart recorder or similar device where it will produce a continuous tracing. (The outputs of the latch element 17 may, on the other hand, as desired, be applied directly to some suitable digital device for storage, for viewing or for analysis; in such case the outputs from the latch element 17 will directly reflect the time difference values).

A perfect test pattern image on the film will produce a time difference value of zero (e.g. volts); any departure from the ideal image will produce non-zero values, with higher values indicating greater image spread conditions. It is, therefore, possible to determine the optimum exposure conditions by running one or more test strips of film through the above described system and selecting the exposure conditions which provide a film strip which produces the lowest output (e.g. voltage) for the analogue signal coupled with a desired level of opacity.

In general an analysis which exploits the present invention may proceed as follows:

A series of exposures is made of a test pattern on different portions of a strip of film from, for example, a new batch whose characteristics are unknown. These exposures are made at varying lamp intensity levels, with careful records being kept of the conditions of each test exposure. The resulting negative is developed, and a series of prints are then made, also at a number of different test exposure levels and records kept thereof. A so obtained film strip, is then assessed, exploiting the present invention to determine the optimum conditions which result in the most accurate reproduction of the test pattern with the desired level of opacity. These conditions are then duplicated for the recording and printing of the actual sound material.

The present invention may exploit various available logic elements; the choice of elements depends on whether or not the elements are capable of being connected and configured for the purposes of the present invention. Thus, by way of example only, the following elements may be used for the various functions of the example system of the invention as illustrated in FIG. 5:

1. The two flip-flops 15 and 18 may be the two flip-flops contained within a Texas Instruments SN74LS74N dual D-type flip-flop device, which has its power pins connected to +5 volts (pin 14) and ground (pin 7)
2. The three delay elements 19, 20 and 21 may be NAND gates contained within a Texas Instruments SN74LS00N quad NAND gate device, which has its power pins connected to +5 volts (pin 14) and ground (pin 7).

[Devices 1. and 2. above are chosen from a relatively slow logic family in order to ensure sufficiently long propagation delays so as to achieve adequate pulse widths.]

3. The up-down counter element 16 may be a Texas Instruments SN74AS867NT octal binary up-down counter device. In addition to its power pins (pin 24 to +5 volts and pin 12 to ground) a number of unused inputs are also connected. These are pins 3 to 11 inclusive and pin 23, which are all grounded.
4. The latch element 17 may be a Texas Instruments SN74ALS996NT octal D-type latch device. In addition to its power pins (pin 24 to +5 volts and pin 12 to ground) a number of unused inputs are also connected. These are pins 10, 13 and 14 which are connected to +5 volts and pins 9 and 15 which are grounded.
5. The digital-to-analogue converter element 35 may be a Datel DAC-UP8BC digital-to-analogue converter device. This device is powered from ±15 volts rather than +5 volts as are all the other elements. Pins 1, 10 and 22 are grounded as noted.

[Devices 3., 4. and 5. above are interconnected by corresponding sets of eight pins for transfer of eight bit digital data]

Figure 7:
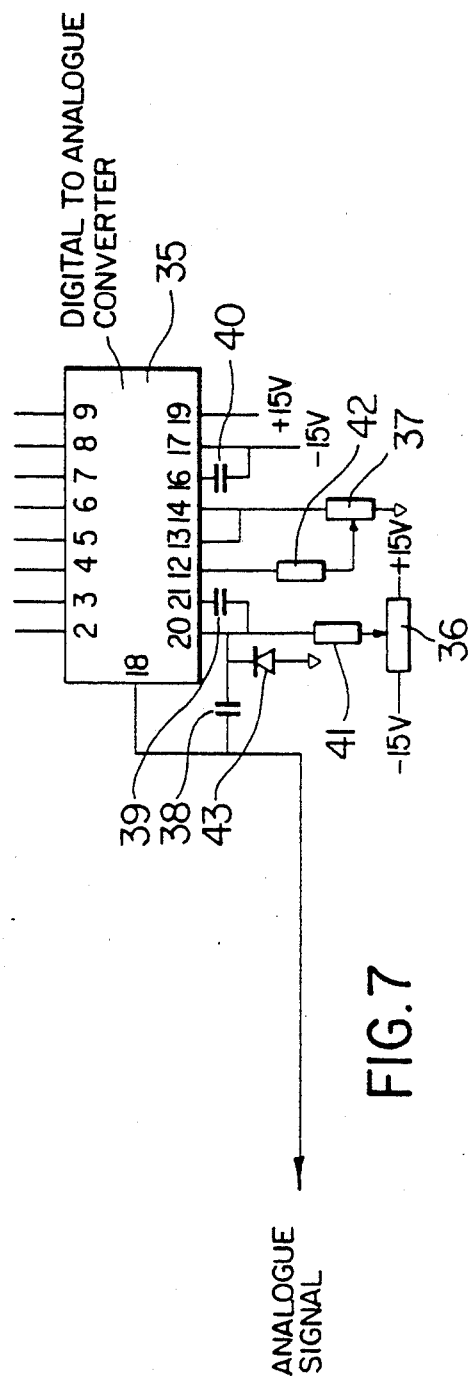
FIG. 7 shows an example of a possible arrangement of elements connected to a digital-to-analogue converter element to provide ancillary control functions for a system such as illustrated in FIG. 5.

Referring to FIG. 7, there is also illustrated an example of a possible scheme for ancillary control of a system exploiting the above specifically described elements; any other suitable scheme may of course be used. Thus the ancillary elements shown in FIG. 7 are coupled to digital-to-analogue converter element which comprises the above mentioned device from Datel, the numbers thereon indicating pin numbers for such converter element. The values of the various components such as the resistors and capacitors, are chosen so as to provide calibration and stability compensation respectively, with the two variable resistors 36 and 37 (e.g. each being 10K ohm) enabling both reference and zero adjustment. The nominal output (at pin 18) of the element 35 when connected as shown may be 0 to +10 volts for a count input of 0 to 255. The components may for example have the following values:

capacitor 38 = 50 pf
capacitor 39 = 1000 pf
capacitor 40 = 0.1 uf
resistor 41 = Megohm
resistor 42 = 80K ohm; and
diode 43 = 1N4148.

Although the invention has been particularly described with an eye to its use for the analysis of recordings employing data in digital form, it may also be applied to an analysis of recordings of analogue data. The recording apparatus in this case may not be capable of explicitly recording the alternating test pattern described above, but it may be used to create the same result by having applied to it an analogue sine wave with a frequency equal to the highest frequency of sound that it is desired to record, and an amplitude such that the recorder is driven into saturation and the result is a square wave such that the entire sound track area is utilized. This will produce a test pattern of the type as may be exploited by the present invention.

Figure 1C:
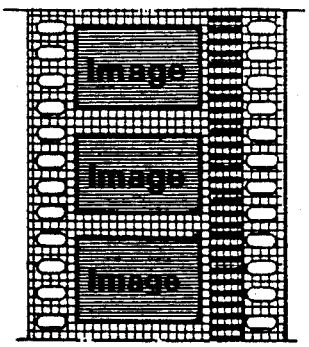

Thus, for example, negative images such as seen in FIGS. 1B, 2B and 3B may be created in a standard Westrex 1581 analogue sound camera (or equivalent) by applying a high-amplitude sinusoidal signal of the desired frequency to the input, the amplitude being sufficient to drive the system into saturation and result in an essentially square-wave photographic record. The test pattern may, for example, be recorded on Eastman Kodak 5373 sound negative film, which may then be developed and printed onto Eastman Kodak 5384 colour print film, with the sound track area (containing the test pattern) receiving a further redevelopment process which results in a monochromatic sound track image alongside the colour picture image. The result would be positive prints such as seen in FIGS. 1C, 2C and 3C. Alternatively, a digital recording means may be employed, using the same basic mechanical means as the Westrex camera for controlling film motion but instead of using a standard galvanometer or light valve analogue light modulation technique, a cathode-ray tube, laser, array of light emitting diodes, or some other analogous means, would be used for generating a digitally-modulated light signal.

Finally, the derivation of EQN (1) can be described as follows: The up-down counter element 16 comprises a data word of eight binary bits in width, permitting a maximum count value of 255. For the purposes herein it shall be assumed that the worst-case image spread results in a test signal with a ratio R of logic states, where R is a positive fractional number reflecting the percentage of the height of a pair of bars occupied by the spread (exposed) image area. The ideal case of an equal-height pair of bars would therefore result in a value of R of 0.5. Thus, for example, one may choose a worst-case scenario where the exposed (opaque) area occupies 90% of the height of the pair of bars and the unexposed (transparent) area occupies 10%, resulting in a value of R of 0.9. It is required under these conditions that the up-down counter element 16 not overflow, i.e. that its maximum count not exceed 255. The maximum count is a function of how long the counter is in either its COUNT UP or COUNT DOWN state and the frequency of the clock signal. The longest time period in either logic state under the above conditions is given by R times the total duration of a light/dark cycle, which in the case of a bar test pattern is equal to the height of a pair of rows divided by the film velocity. This value is therefore $$R \times \frac{2H_{row}}{V_{film}}.$$

and this is the duration of 256 counts of the OSC signal. Thus we have $$\tau_{256} = R \times \frac{2H_{row}}{V_{film}}.$$

where $\tau_{256}$ is the duration of 256 counts. Frequency being the inverse of duration, the required frequency of the OSC signal is therefore the inverse of this value, multiplied by 256, yielding EQN (1).

The following illustrates some examples: For 35 mm film, with a value of R of 0.9, the following apply:
digital system, characteristic dimension of 12 microns, $f_{osc}=5,418,666$ Hz
digital system, characteristic dimension of 15 microns, $f_{osc}=4,334,933$ Hz
analogue system, highest desired frequency 18,000 Hz, $f_{osc}=5,120,000$ Hz For 16 mm film, with a value of R of 0.9, the following apply:
digital system, characteristic dimension of 12 microns, $f_{osc}=2,167,466$ Hz
digital system, characteristic dimension of 15 microns, $f_{osc}$ 1,733,973 Hz
analogue system, highest desired frequency 7,000 Hz, $f_{osc}=1,991,111$ Hz

I claim:

1. A method for assessing the effect of exposure conditions on the recording and reproduction of an optical sound track on motion picture film, comprising.
   a) providing said optical sound track with an image test pattern which is an image of a desired test pattern,
      said image test pattern being configured such that the image test pattern will induce a photosensor means to generate a test signal which repetitively alternates between two different states,
      said image test pattern being applied to said track under predetermined exposure conditions,
   b) optically scanning said optical sound track with said photosensor means to generate, in response thereto, said test signal which repetitively alternates between two different states,
   c) for each pair of different states of said signal, comparing the duration of one of said states thereof with the duration of the respective other state thereof so as to obtain a time difference value, and
   d) comparing the obtained time difference value with a predetermined time difference value associated with the desired test pattern, any departure from the predetermined time difference value being indicative of dimensional differences between the image test pattern as obtained under said predetermined exposure conditions and the desired test pattern.

2. A method as defined in claim 1 wherein said image test pattern comprises alternating regions of essentially transparent and essentially opaque parallel bars disposed normal to the direction of motion picture film travel, said desired test pattern comprising bars as defined hereinabove which are of height equal to the characteristic dimension of the digital sound data it is desired to record on the film.

3. A method as defined in claim 1 wherein said image test pattern comprises alternating regions of essentially transparent and essentially opaque parallel bars disposed normal to the direction of motion picture film travel, said desired test pattern comprising bars as defined hereinabove which are of height equivalent to half the period of the highest frequency analogue sound signal desired to be recorded.

4. A method for assessing the effect of exposure conditions on the recording and reproduction of an optical sound track, comprising,
   a) providing said optical sound track with an image test pattern which is an image of a desired test pattern,
      said image test pattern being configured such that the image test pattern will induce a photosensor means to generate a test signal which repetitively alternates between two different states,
      said image test pattern being applied to said track under predetermined exposure conditions,
   b) optically scanning said optical sound track with said photosensor means to generate, in response thereto, said test signal which repetitively alternates between two different states,
   c) comparing the duration of one of said states with the duration of the other state so as to obtain a time difference value, and
   d) comparing the so obtained time difference value with a predetermined time difference value associated with the desired test pattern, any departure from the predetermined time difference value being indicative of dimensional differences between the image test pattern as obtained under said predetermined exposure conditions and the desired test pattern.

5. A system for assessing the effect of exposure conditions on the recording and reproduction of an optical sound track on motion picture film, said track being provided with a test pattern, said system comprising,
  i) photosensor means for optically scanning said optical sound track and for generating, in response thereto, a test signal which repetitively alternates between two different states,
  ii) an analyzer system for analyzing said test signal by comparing the duration of said states,
said test pattern having been configured to induce the photosensor to generate said test signal, said photosensor means being electrically connected to said analyzer system for feeding said test signal thereto, said analyzer system comprising
  (a) a clock means for generating a clock signal,
    said clock signal being composed of a clock pulse which repeats at a predetermined frequency,
  (b) a count command means for generating a count signal,
    said count command means having an input for said test signal, said count command means having two different states and being electrically connected to said clock means,
    said count command means being configured to alternate between the two different states thereof in synchronization with said clock signal and in response to the change in state of said test signal,
    said count signal comprising a plurality of duty cycle pulses, each duty cycle pulse comprising a pair of duty cycle signal portions, each pair of duty cycle signal portions comprising one duty cycle signal portion which is generated during the time interval that the count command means is in one of its states and a different duty cycle signal portion which is generated during the time interval that the count command means is in the other of its states,
  (c) an electronic up-down counter means for counting the number of said clock pulses in said clock signal,
    said up-down counter means being electrically connected to said clock means,
    said up-down counter means being electrically connected to said count command means such that, in response to each duty cycle pulse, said up-down counter means,
      counts up for the duration of one duty cycle signal portion thereof and
      counts down for the duration of the other duty cycle signal portion thereof,
    said up-down counter means generating a digital signal varying with the level of the count, said up-down counter means having a reset input,
  (d) latch means for taking up a digital signal generated by said up-down counter means,
    said latch means having an activation input, and
  (e) a counter reset means for generating a reset signal for resetting the up-down counter means and an activation signal for activation of said latch means, said counter reset circuit means being electrically connected to said count command means, the reset input of the up-down counter means and the activation input of said latch means, said counter reset circuit means being configured such that said activation and reset signals are generated in response to the count signal, at the end of each duty cycle pulse thereof, and
    said counter reset circuit means being configured such that, prior to the up-down counter means being reset in response to the reset signal, said latch means takes up, in response to said activation signal, the digital signal as generated by the up-down counter means at the end of each duty cycle pulse, said latch means generating a digital number output signal varying with said digital signal taken up by the latch means.

6. A system as defined in claim 5 including
  (f) a digital-to-analogue converter means for converting the digital number output signal of said latch means to an analogue signal proportional to the value of the said digital number output signal as applied to the input of the digital-to-analogue converter means,
    said digital-to-analogue converter means being electrically connected to said latch means, and
  (g) signal display means for viewing said analogue signal,
    said signal display means being electrically connected to said digital-to-analogue converter means.

7. A system as defined in claim 6 wherein said signal display means is selected from the group comprising a chart recorder and an oscilloscope.

8. A system for analyzing a test signal, which repetitively alternates between two different states, by comparing the duration of said states, said system comprising
  (a) a clock means for generating a clock signal,
    said clock signal being composed of a clock pulse which repeats at a predetermined frequency,
  (b) a count command means for generating a count signal,
    said count command means having an input for said test signal, said count command means having two different states and being electrically connected to said clock means,
    said count command means being configured to alternate between the two different states thereof in synchronization with said clock signal and in response to the change of state of said test signal,
    said count signal comprising a plurality of pairs of duty cycle signal portions, each pair of duty cycle signal portions comprising one duty cycle signal portion which is generated during the time interval that the count command means is in one of its states and a different duty cycle signal portion which is generated during the time interval that the count command means is in the other of its states,
  (c) an electronic up-down counter means for counting the number of said clock pulses in said clock signal,
    said up-down counter means being electrically connected to said clock means,
    said up-down counter means being electrically connected to said count command means such that, in response to each pair of duty cycle signal portions, said up-down counter means, counts up for the duration of one duty cycle signal portion thereof and counts down for the duration of the other duty cycle signal portion thereof, said up-down counter means generating a digital signal varying with the level of the count, said up-down counter means having a reset input, (d) latch means for taking up a digital signal generated by said up-down counter means, said latch means having an activation input, and (e) a counter reset means for generating a reset signal for resetting the up-down counter means and an activation signal for activation of the latch means, said counter reset means being electrically connected to said count command means, the reset input of said up-down counter means and the activation input of said latch means, said counter reset means being configured such that said activation and reset signals are generated in response to the count signal, at the end of a plurality of duty cycle signal portions thereof, and said counter reset means being configured such that, prior to the up-down counter means being reset in response to said reset signal, said latch means takes up, in response to said activation signal, the digital signal as generated by the up-down counter means at the end of said plurality of duty cycle signal portions, said latch means generating a digital number output signal varying with said digital signal taken up by the latch means.

9. A system as defined in claim 8 wherein said counter reset means is configured such that said activation and reset signals are generated in response to the count signal, at the end of a pair of duty cycle signal portions thereof, and said counter reset means is configured such that, prior to the up-down counter means being reset in response to said reset signal, said latch means takes up, in response to said activation signal, the digital signal as generated by the up-down counter means at the end of said pair of duty cycle signal portions.

10. A system as defined in claim 8 including (f) a digital-to-analogue converter means for converting the digital number output signal of said latch means to an analogue signal proportional to the value of the said digital number output signal as applied to the input of the digital-to-analogue converter means, said digital-to-analogue converter means being electrically connected to said latch means, and (g) signal display means for viewing said analogue signal, said signal display means being electrically connected to said digital-to-analogue converter means.

11. A system as defined in claim 10 wherein said signal display means is selected from the group comprising a chart recorder and an oscilloscope.

* * * * *